United States Patent [19]

Fedor et al.

[11] 3,978,193

[45] Aug. 31, 1976

[54] METHOD AND APPARATUS FOR TREATING EXHAUST GASES

[75] Inventors: Robert J. Fedor, Westlake; Chin-Ho Lee, Lyndhurst; M. Paul Makowski, Wickliffe, all of Ohio

[73] Assignee: Gould Inc., Rolling Meadows, Ill.

[22] Filed: Jan. 29, 1974

[21] Appl. No.: 437,674

[52] U.S. Cl. .............................. 423/213.7; 60/274; 60/301; 23/288 F
[51] Int. Cl.² ..................................... B01D 53/00
[58] Field of Search ........... 60/274, 301; 423/213.2, 423/213.5, 213.7; 23/288 F

[56] References Cited
UNITED STATES PATENTS

| | | | |
|---|---|---|---|
| 3,047,484 | 7/1962 | Stacy et al. | 75/124 |
| 3,232,373 | 2/1966 | Bjork | 55/DIG. 30 |
| 3,546,075 | 12/1970 | Sheetz et al. | 148/29 X |
| 3,719,739 | 3/1973 | Thompson | 60/301 |
| 3,773,894 | 11/1973 | Bernstein | 60/301 |
| 3,809,743 | 5/1974 | Unland | 60/301 |
| 3,825,654 | 7/1974 | Kobylinski | 60/301 |
| 3,852,063 | 12/1974 | Niimi et al. | 75/124 |
| 3,872,213 | 3/1975 | Haseba | 423/213.7 |
| 3,886,260 | 5/1975 | Unland | 423/213.5 |

FOREIGN PATENTS OR APPLICATIONS

| | | | |
|---|---|---|---|
| 819,114 | 7/1969 | Canada | 423/213.2 |
| 1,132,899 | 7/1962 | Germany | 29/180 SS |

OTHER PUBLICATIONS

Kulik et al,. "Elimination of Nitrogen Oxides from Exhaust Gases," Chem. Abstracts, vol. 59, 1963, p. 13,258.

"Chemical Abstracts," vol. 69, 1963, p. 13258.

Meguerian et al., S.A.E. Paper 720480, May 1972.

Primary Examiner—Peters, G. O.
Attorney, Agent, or Firm—Edward E. Sachs

[57] ABSTRACT

A method and means for catalytically removing impurities found in the exhaust stream emanating from the internal combustion engine is provided. Such exhaust gases are initially brought into contact with a metallic oxidation catalyst at a temperature sufficient to cause a significant amount of the unreacted oxygen present to be removed therefrom by reacting it with oxidizable materials in the exhaust gases, with the oxidation catalyst employed being characterized by its lack of activity with respect to converting nitrogen and hydrogen found in exhaust gases into ammonia. The so-treated exhaust gases are then brought into contact with a nitrogen oxide ($NO_x$) reducing catalyst, which is also characterized by its lack of activity with respect to converting nitrogen and hydrogen found in the exhaust gases into ammonia, at a temperature sufficient to cause nitrogen oxide gases in the exhaust gases to be catalytically reduced. Subsequently, the resultant exhaust gases are then brought into contact with an oxidation catalyst in an oxygen containing atmosphere at a temperature sufficient to cause carbon monoxide and gaseous hydrocarbons present in the exhaust gases to be oxidized to less harmful substances.

23 Claims, 2 Drawing Figures

METHOD AND APPARATUS FOR TREATING EXHAUST GASES

BACKGROUND OF THE INVENTION

This invention relates to a method and means for catalytically reducing the various amounts of pollutants found in the exhaust gases emanating from the internal combustion engine.

Presently, much effort is being directed toward the removal of carbon monoxide and unburned hydrocarbons by thermal or catalytic oxidation, and to the diminution or elimination of nitrogen by catalytic reduction.

With regard to the elimination or diminution of the various combustibles found in the exhaust gases emanating from the internal combustion engine, present U.S. Governmental standards require that by 1976 the hydrocarbon content of the exhaust gases be reduced to at least 0.41 grams per mile and that the carbon monoxide content be reduced to at least 3.4 grams per mile. In addition, these standards also require that the nitrogen oxide ($NO_x$) content of the exhaust gas be reduced to less than 0.4 grams per mile by 1977.

One system which has been suggested for accomplishing such a reduction of pollutants is the so-called dual bed catalyst system. In this system, two catalysts are utilized. One catalyst is designed to reduce nitrogen oxide emissions to less harmful substances while another catalyst is employed to aid in the oxidation of carbon monoxide and the various hydrocarbon gases present in the exhaust gases.

The catalyst which is most often suggested for use in oxidizing carbon monoxide and hydrocarbon gases is composed of a ceramic substrate, e.g., aluminum oxide, having deposited on the surface thereof a platinum catalyst.

With regard to the nitrogen oxide ($NO_x$) reducing catalyst, various structures have been suggested. One such structure consists of a metallic substrate having adherently bonded to the surface thereof a $NO_x$ reducing catalyst. Such a type of catalyst is more fully described in copending application Ser. No. 207,338, which is assigned to the assignee of the present application.

As used herein both the terms "nitrogen oxide" and "$NO_x$" refer to the various oxides of nitrogen found in the exhaust gases of the internal combustion engine.

In the operation of a dual bed catalyst system which employs these general types of catalysts, the exhaust gases are brought into contact with the $NO_x$ reducing catalyst and then brought into contact with the oxidation catalyst to effect the oxidation of carbon monoxide and/or the various unburned hydrocarbons which may be present.

While such a dual bed catalyst system is highly successful in reducing the amount of undesirable components found in the exhaust gases emanating from the internal combustion engine, difficulties are encountered with regard to the longevity of this catalyst system. In the main, such difficulties are associated with the fact that the $NO_x$ reducing catalyst begins to deteriorate rather rapidly, thereby limiting the life of the dual catalyst system.

Recently it has been discovered that the life of a $NO_x$ reducing catalyst of the foregoing type can be significantly improved by bringing the exhaust gases into contact with an oxidation catalyst to substantially remove the unreacted oxygen therefrom and then subjecting the so-treated exhaust gas to the action of the $NO_x$ reducing catalyst. While this discovery resulted in a $NO_x$ reducing catalyst which evidenced increased durability, a secondary problem was experienced. Basically, during the preliminary treatment with the oxidation catalyst, nitrogen and hydrogen present in the exhaust gases reacted to form ammonia. The ammonia then passed through the $NO_x$ catalyst and when brought into contact with the second oxidation catalyst was oxidized to form $NO_x$. Obviously, this system resulted in a final product very high in $NO_x$ content. Subsequently, it was quite unexpectedly discovered that the problem of ammonia generation could be avoided by employing an oxidation catalyst which comprises a metallic substrate having a layer of electrically, nonconducting metal oxide on the surface thereof and a platinum group metal adherently deposited on at least part of the surface of the nonconducting metal oxide.

SUMMARY OF THE INVENTION

Very briefly, the present invention concerns a method of treating the exhaust gases emanating from the internal combustion engine to significantly reduce the nitrogen oxide ($NO_x$), carbon monoxide and hydrocarbon content thereof in an effective and efficient manner. In one aspect the present invention provides a method for operating an internal combustion engine system which includes an internal combustion engine and a means for supplying a mixture of fuel and unreacted oxygen to the engine wherein exhaust gases from the internal combustion engine of the system, which include carbon monoxide, hydrocarbons and nitrogen oxides, are catalytically converted to relatively harmless substances comprising the steps of:

a. operating the engine while supplying a mixture of fuel and unreacted oxygen thereto in such a manner as to cause the exhaust gases to contain relatively low amounts of unreacted oxygen, with the free or unreacted oxygen content being preferably reduced to less than about one volume percent;

b. bringing the unreacted exhaust gases into contact with an oxidation catalyst at a temperature sufficient to cause unreacted oxygen in the exhaust gases to be removed therefrom by reacting it with oxidizable material (e.g., carbon monoxide, hydrogen and/or unburned hydrocarbons) in the exhaust gases with the unreacted oxygen content of the resultant exhaust gases being reduced to less than about 0.05 volume percent, with the oxidation catalyst being characterized by its lack of activity with respect to converting nitrogen and hydrogen present in the exhaust gases into ammonia;

c. directing the so-treated exhaust gases into contact with a nitrogen oxide reducing catalyst at a temperature sufficient to cause nitrogen oxide gases in the exhaust gases to be catalytically reduced without the formation of appreciable amounts of ammonia;

d. causing the exhaust gases to contact an oxidation catalyst in an oxygen containing atmosphere at a temperature sufficient to cause carbon monoxide and gaseous hydrocarbons which are present therein to be oxidized.

In order to operate the internal combustion engine in a manner such that the exhaust gases therefrom contain relatively low amounts of unreacted oxygen, preferably less than 1 volume percent, the engine is operated with an air/fuel ratio on the rich side of stoichiometric (rich referring to excess fuel) which is primarily accomplished by adjusting the carburetion setting. It is also contemplated to utilize fuel injection as well as other conventional means to supply the engine with the necessary amounts of fuel and oxidant therefor. In the preferred practice of the instant invention it is generally desirable to operate the internal combustion engine in a manner such that the air/fuel ratio generally ranges from about 13.8 to 1 to about 14.5 to 1. However, it will be appreciated by those skilled in the art that depending on the specific fuel utilized, the type of catalyst employed and the temperature at which the gases contact the concerned catalyst, this ratio may vary slightly. In general, it can be stated that the ratio of carbon monoxide to oxygen found in the exhaust gas should be about ten to one.

The catalyst utilized to remove the unreacted oxygen from the exhaust gases (i.e., the initial oxidation catalyst) can be any known oxidation catalyst, provided that this catalyst does not cause the nitrogen and hydrogen found in the exhaust gases to be converted to significant amounts of ammonia. In this regard it is preferred to treat the exhaust gases in such a manner that the unreacted oxygen content thereof is less than about 0.05 volume percent. This reduction in oxygen content can be accomplished in many ways, however, the preferred catalyst comprises a substrate of expanded metal foil having a layer of electrically nonconducting metal oxides on the surface thereof and, in turn, a platinum group catalyst material adherently deposited on at least part of the surface of the nonconducting metal oxide.

In the practice of the instant invention, the starting metal foil or substrate is preferably fabricated from either a nickel, cobalt or iron base material which has been alloyed with an oxide forming metal such as aluminum, silicon, chromium, titanium or mixtures thereof. By the term "base metal", as used therein, is meant that the amount or weight percent of one of the elements in the group consisting of iron, nickel and cobalt always exceeded the amount or weight percent of any other of these elements which may also be present. However, the exact composition which is to be employed in fabricating a particular sheet of expanded metal foil used as a substrate in the formation of an oxidation catalyst of the type herein described depends to a great degree on the type of automotive exhaust environment in which the resultant catalytic structure is to be utilized.

The exact amount of metal oxide former which must be present in the composition of the substrate is not known with mathematical certainty. However, the preferred oxide forming metals are aluminum, silicon, chromium, titanium, iron, nickel, cobalt and mixtures thereof. All that is required is that the metal oxide former be present in an amount sufficient to yield a surface layer of oxide material which substantially prevents the platinum group metal deposited thereon from diffusing into the substrate proper. To date, excellent results have been achieved by using an iron base material which contains about 22 weight percent chromium and 4.5 weight percent aluminum. The oxidation resistant metal foil or substrate to be used in practice of the instant invention can be produced by various well known metal forming techniques and accordingly these techniques will not be described herein in detail. The thin sheet of oxidation resistant metal foil used as a substrate usually has a thickness of about 0.01 inch or less. In actual practice, it has been found desirable to employ thin metal foil having a thickness ranging from about 0.004 inch to about 0.008 inch. In the preferred practice of the subject invention, a sheet of metal foil of the type herein described is expanded by conventional metal expanding techniques. The exact technique employed in the expanding of the sheet of metal foil is not critical. Since such expanding techniques are well known, they will not be described herein in detail. The expanded metal foil preferably consists of a plurality of strands of metal having a thickness ranging from about 0.002 inch to about 0.010 inch.

The sheet of expanded metal foil is then subjected to an oxidizing treatment which causes a layer of metal oxide to be formed on the surface of the expanded structure. In practice, it has been found preferable to place a sheet of expanded metal foil in an oven having an oxygen containing atmosphere and then heat the sheet of metal foil therein to a temperature of about 1800°F for a period of about 16 hours.

Subsequently, a platinum group catalyst material is then deposited on the surface of a nonconducting metal oxide layer. This deposition can be accomplished by many techniques. For example, it can be accomplished by metallurgy techniques, by electroless plating techniques and various chemical and thermal deposition techniques. In the preferred practice of the invention, the platinum group catalyst is deposited on the surface of the nonconducting metal oxide by an electroless plating technique. Usually these electroless plating techniques require that the material to be plated be pretreated, i.e., sensitized and treated with a seeding material. In the practice of the instant invention, when it is desired to deposit a platinum catalyst on the surface of the metal oxide, it is desirable to first sensitize the surface of the metal oxide by treating it with stannous chloride solution and then seeding the so-treated surface by treating the sensitized surface with a palladium chloride solution. Once the sensitizing and seeding procedures have been completed, the platinum base metal is then electroless plated on the article. This is usually accomplished by simply submerging the article to be plated in a suitable platinum containing electroless plating bath. Baths for electrolessly plating platinum and platinum group metals are well known in the art and their exact composition depends on such factors as the type of substrate and the amount of platinum group metal to be deposited.

In the preferred practice of the invention, a platinum group metal is utilized as the oxidation catalyst for the initial oxidation catalyst structure. As used herein the terms "platinum group metal" means a metal selected from the group consisting of platinum, iridium, osmium, palladium, rhodium, ruthenium and mixtures thereof.

The preferred $NO_x$ reducing catalyst structure employed in the practice of the instant invention is described in copending U.S. application No. 207,338 entitled "Apertured Article for Catalytic Reduction of $NO_x$ Gases Found in the Exhaust Stream of the Internal Combustion Engine", which is assigned to the assignee of the instant invention. Basically, it comprises a catalytic structure means effective to reduce $NO_x$ which is adapted to be placed in a housing through which exhaust flow which is sized such that a major portion of the gases passing through the housing pass through the catalytic structure means with the catalytic structure means including an arrangement of apertured thin metal foil having a $NO_x$ reducing catalyst provided on the surface thereof. The preferred catalyst material proper is an alloy of nickel and copper wherein the weight ratio of nickel to copper is greater than 9 to 1. This material is described in co-pending application Ser. No. 305,738 which is assigned to the assignee of the instant application. Such a catalyst structure is characterized by the fact that it does not significantly catalyze the reaction of nitrogen and hydrogen to form ammonia.

Any conventional catalyst which is known to oxidize carbon monoxide and gaseous hydrocarbon in an oxygen containing atmosphere can be employed in the practice of the instant invention as the final oxidation catalyst. The preferred catalyst being a honeycomb or pelletized bead structure which is composed of aluminum oxide and has deposited on the surface thereof a platinum catalyst material.

The instant invention can be better understood by reference to the following examples which are set forth herein for illustrative purposes only and are not intended to unduly limit the scope of the instant invention.

BRIEF DESCRIPTION OF THE DRAWINGS

Referring to the drawings in detail, FIG. 1 depicts the internal combustion engine system of the instant invention which includes an internal combustion engine 10 having communicating therewith a source of fuel 12 and a source of an oxidant for the fuel 14. During operation of the internal combustion engine 10 exhaust gases are generated which pass through conduit 16 into the catalytic assembly or apparatus 18 for the purpose of purifying the exhaust gases. The exhaust gases enter port 17 where they contact an initial oxidation catalyst positioned in chamber or housing 20. The gases then pass into housing or chamber 22 which contains a $NO_x$ reducing catalyst. The catalyst therein affects the removal of a significant amount of $NO_x$ therefrom. After the treatment, the exhaust gases are then passed through chamber or housing 24 which contains a second or final oxidation catalyst to remove carbon monoxide and gaseous hydrocarbons therefrom. The exhaust gases are then vented through outlet port 26 to the atmosphere, in the desired manner. The second or final catalyst is maintained in an oxygen-containing atmosphere in a conventional manner such as depicted in U.S. Pat. No. 3,773,894 to Bernstein et al.

In the above described embodiment of the invention the initial or first oxidation catalyst utilized in chamber or housing 20 is formed of expanded metal which has been provided with an oxidation resistant surface which, in turn, has deposited thereon a platinum group catalyst. As this initial or first oxidation catalyst has been herein described, it will not now be described in detail. The $NO_x$ reducing catalyst utilized in chamber or housing 22 to catalytically reduce $NO_x$ found in the exhaust is preferably of the type described in U.S. Pat. application Ser. No. 207,338 having a catalyst surface of the type described in U.S. Pat. application Ser. No. 305,738. The oxidation catalyst employed to remove the carbon monoxide and hydrocarbon gases from the exhaust gases usually consists of a ceramic substrate which is usually in the form of a honeycomb or pelleted structure having deposited on the surface thereof platinum catalyst material.

Figure 1:
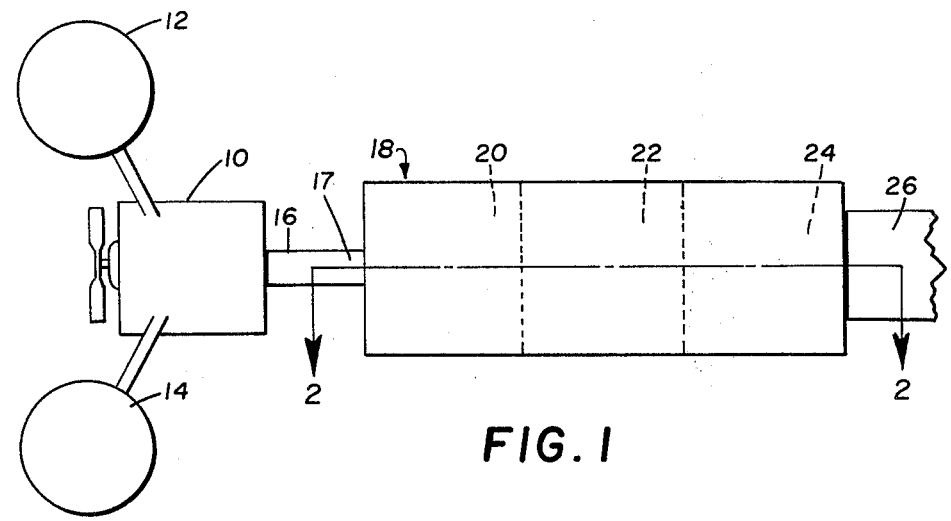
FIG. 1 is a diagrammatic illustration of the internal combustion engine system of the invention.
Figure 2:
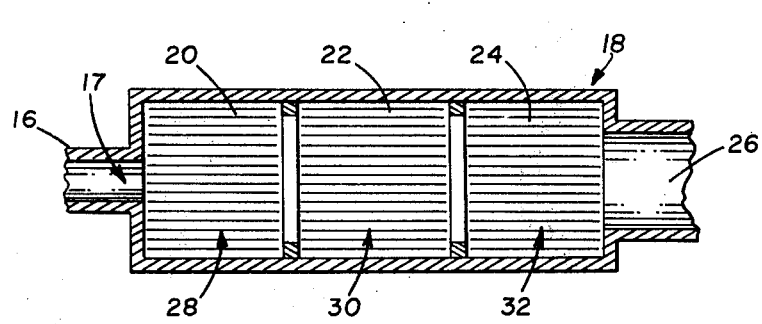
FIG. 2 is a cross-sectional view taken along line 2—2 of FIG. 1.

It will be appreciated by those skilled in the art that in the practice of the instant invention the apparatus for purifying exhaust gases can be in the form of a single unitary housing 18, as shown in FIG. 2, consisting of a first chamber 20, a second chamber 22 and a third chamber 24 with the initial or first oxidation catalyst 28 being positioned in chamber 20 and the $NO_x$ reducing catalyst 30 in chamber 22 and the final or second oxidation catalyst 32 in chamber 24 or, alternatively, it can be fabricated from a series of individual chambers or housings containing the concerned catalyst. Also, it may be desirable to form both the initial oxidation catalyst and the $NO_x$ reducing catalyst in one separate unit, with the final oxidation catalyst being an independent separate unit reasonably removed from the combination unit but communicating therewith for the flow of gas from the combination unit to and through the final oxidation catalyst unit.

EXAMPLE 1 a. An internal combustion engine having associated therewith a conventional carburetion system for supplying fuel and oxygen to the engine is provided, with the carburetor therefor being pre-set to have an air to fuel ratio of about 14.2 to 1.

b. The engine was operated in a manner such as to cause the exhaust gases to contain a low amount of unreacted oxygen.

c. The untreated exhaust gases were then brought into contact with an oxidation catalyst consisting of an expanded metal substrate composed of an iron base alloy containing 22 weight percent chromium and 4.5 weight percent aluminum having a protective oxide layer formed on the surface thereof and, in turn, a layer of platinum deposited on the surface of the metal oxide layer. The temperature at which the untreated exhaust gases were brought into contact with the oxidation catalyst was about 1180°F. An analysis of the gases emanating from the oxidation catalyst showed that the oxygen content thereof was about 0.06 volume percent as contrasted with an original content of about 0.4 volume percent. In addition, it was noted that the ammonia content of the so-treated exhaust gas was about 9 ppm.

d. These exhaust gases were then brought into contact with a $NO_x$ reducing catalyst of the type described in U.S. Pat. applications Ser. Nos. 207,338 and 305,738 at a temperature of about 1220°F. An analysis of the exhaust gas before it entered the $NO_x$ catalyst showed that it contained about 888 ppm nitrogen oxide. After being so-treated with a $NO_x$ reducing catalyst, the exhaust gases contained about 2.5 ppm $NO_x$ and about 114 ppm ammonia.

e. The so-treated exhaust gases, containing about 1.25 volume percent carbon monoxide and about 427 ppm unburned hydrocarbon gases (as butane), were then brought into contact with a conventional oxidation catalyst in an oxygen containing atmosphere. The catalyst employed was a honeycomb structure of alumina having deposited on the surface thereof active platinum. The amount of carbon monoxide and hydrocarbon gases found in the so-treated exhaust gases was about 0.04 volume percent and 72 ppm, respectively. The $NO_x$ content was about 96 ppm.

EXAMPLE 2 a. A simulated internal combustion engine exhaust gas environment consisting of 500 ppm hydrocarbon (as butane), 1000 ppm nitrogen oxide, 0.3 percent oxygen, 2.0 percent carbon monoxide, and 12.0 percent carbon dioxide was brought into contact with an initial or first oxidation catalyst of the type described in Example 1. After being subjected to the initial oxidation treatment, it was noted that the oxygen content of the simulated exhaust gas was approximately zero volume percent. Also, it was noted that the ammonia content of said gas was about 64 ppm.

b. The so-treated simulated exhaust gases were then brought into contact with a nitrogen oxide ($NO_x$) reducing catalyst of the type described in Example 1 at a temperature of about 1200°F to cause $NO_x$ gases therein to be catalytically reduced. An analysis of the gases after being so reduced showed that the amount of $NO_x$ present was about 10 ppm.

c. The resultant treated exhaust gases were then caused to contact a second oxidation catalyst of the type described in Example 1 in an oxygen containing atmosphere at a temperature of about 1100°F. An analysis of the resultant exhaust gas show that it contains about 0.28 volume percent carbon monoxide, 75 ppm unburned hydrocarbons and 40 ppm $NO_x$.

EXAMPLE 3 a. An internal combustion engine having associated therewith a conventional carburetion system for supplying fuel and oxygen to the engine is provided, with the carburetor therefor being present to have an air to fuel ratio of about 14.2 to 1.

b. The engine was operated in a manner such as to cause the exhaust gases to contain a low amount of unreacted oxygen.

c. The untreated exhaust gases were then brought into contact with an oxidation catalyst consisting of a ceramic (aluminum oxide) substrate having on the surface thereof a layer of platinum. An analysis of the gases emanating from the oxidation catalyst showed that the oxygen content thereof was about 0.1 volume percent as contrasted with an original content of about 0.49 volume percent. In addition, it was noted that the ammonia content of the so-treated exhaust gas was about 220 ppm.

d. These exhaust gases were then brought into contact with a $NO_x$ reducing catalyst at a temperature of about 1220°F. An analysis of the exhaust gas before it entered the $NO_x$ catalyst showed that it contained about 640 ppm nitrogen oxide. After being so-treated with a $NO_x$ reducing catalyst, the exhaust gases contained about 1.75 ppm $NO_x$ and 167 ppm ammonia.

e. The so-treated exhaust gases, containing about 1.29 volume percent carbon monoxide and about 295 ppm unburned hydrocarbon gases (as butane), were then brought into contact with a conventional oxidation catalyst in an oxygen containing atmosphere. The catalyst employed was a honeycomb structure of alumina having deposited on the surface thereof active platinum. The amount of carbon monoxide and hydrocarbon gases (as butane) found in the so-treated exhaust gases was about 0.05 volume percent and 50 ppm, respectively. The $NO_x$ content was about 175 ppm.

From the foregoing, it can be readily seen that the instant invention provides a unique means of effectively and efficiently reducing nitrogen oxide ($NO_x$), carbon monoxide and unburned hydrocarbon gases from the exhaust stream of the internal combustion engine.

What is claimed is:

1. A method of treating exhaust gases emanating from an internal combustion engine which exhaust gases include carbon monoxide, hydrocarbons, nitrogen oxides and less then about 1 volume percent unreacted oxygen comprising:
   a. removing unreacted oxygen from said exhaust gases without forming significant quantities of ammonia in said gases by contacting the exhaust gases containing less than about 1 volume percent unreacted oxygen with an oxidation catalyst at a temperature sufficient to cause said unreacted oxygen to react with oxidizable material in said exhaust gases;
   b. catalytically reducing nitrogen oxides in said exhaust gas from which oxygen has been removed by contacting the exhaust gas from step (a) with a nitrogen oxide reduction catalyst at a temperature at which the nitrogen oxide gases in said exhaust gas are catalytically reduced, said reduction catalyst comprising an alloy of nickel and copper wherein the weight ratio of nickel to copper is greater than 9 to 1; and
   c. catalytically oxidizing the carbon monoxide and gaseous hydrocarbons present in said exhaust gases from step (b).

2. The method of claim 1 wherein said oxidation catalyst of step (a) comprises a platinum group metal selected from the group consisting of platinum, palladium, iridium, osmium, rhodium, ruthenium, and mixtures thereof.

3. The method of claim 2 wherein said oxidation catalyst of step (a) comprises platinum.

4. The method of claim 3 wherein said oxidation catalyst of step (a) comprises a ceramic substrate having on the surface thereof a layer of platinum.

5. The method of claim 1 wherein in step (a) the oxygen content of said exhaust gases is reduced to less than about 0.05 volume percent.

6. The method of claim 3 wherein in step (a) the oxygen content of said exhaust gases is reduced to less than about 0.05 volume percent.

7. The method of claim 2 wherein said oxidation catalyst employed in step (a) comprises a metallic substrate having a layer of an electrically nonconducting metal oxide on the surface thereof and said platinum group metal adherently deposited on at least a part of the surface of said nonconducting metal oxide.

8. The method of claim 7 wherein said metallic substrate is in the form of expanded metal foil.

9. The method of claim 8 wherein said expanded metal foil consists of a plurality of strands of metal having a thickness ranging from about 0.002 inch to about 0.010 inch.

10. The method of claim 7 wherein said substrate consists essentially of a base material selected from the group consisting of iron base materials, cobalt base materials, and nickel base materials.

11. The method of claim 7 wherein said electrically nonconducting metal oxide is an oxide of a metal selected from the group consisting of aluminum, titanium, chromium, silicon, iron, nickel, cobalt and mixtures thereof.

12. The method of claim 7 wherein said substrate consists essentially of, in weight percent, about 4.5 percent aluminum, about 22 percent chromium, with the remainder being iron plus incidental impurities.

13. The method of claim 1 wherein said oxidizable material in said exhaust gas is selected from the group consisting of carbon monoxide, hydrocarbons, hydrogen and mixtures thereof.

14. The method of claim 1 wherein said exhaust gases emanating from said internal combustion engine are obtained by operating said internal combustion engine at an air to fuel ratio in the range from about 13.8 to 1 to about 14.5 to 1.

15. The method of claim 6 wherein said $NO_x$ reduction catalyst consists essentially of an apertured thin metal foil having a $NO_x$ reducing catalyst on the surface thereof, said reducing catalyst consisting essentially of an alloy of nickel and copper wherein the weight ratio of nickel to copper is greater than 9 to 1.

16. An apparatus for removing impurities from the exhaust gases of an internal combustion engine comprising:
   a. a first oxidation catalyst communicating with said internal combustion engine, said first oxidation catalyst comprising a platinum group metal selected from the group consisting of platinum, palladium, iridium, osmium, rhodium, ruthenium, and mixtures thereof, said catalyst being capable of removing oxygen present in said exhaust gases by causing said oxygen to react with oxidizable components of said exhaust gases and further being capable of removing said oxygen without significantly catalyzing a reaction between hydrogen and nitrogen components of said exhaust gases to form ammonia;
   b. a nitrogen oxide reduction catalyst communicating with said first oxidation catalyst for the passage of said exhaust gases therethrough whereby substantially all of gases passing from said first oxidation catalyst into said nitrogen oxide reduction catalyst are caused to contact said nitrogen oxide reduction catalyst to thereby catalytically substantially reduce nitrogen oxide in said gases without the generation of substantial amounts of ammonia, said nitrogen oxide reduction catalyst comprising an apertured metal foil having an $NO_x$ reducing catalyst on the surface thereof, said reducing catalyst comprising an alloy of nickel and copper wherein the weight ratio of nickel to copper is greater than 9 to 1;
   c. a second oxidation catalyst communicating with said nitrogen oxide reducing catalyst for the passage of said exhaust gases therethrough whereby carbon monoxide and unburned hydrocarbons present in said exhaust gases are caused to be oxidized in the presence of an oxygen-containing atmosphere.

17. The apparatus of claim 16 wherein said first oxidation catalyst comprises platinum.

18. The apparatus of claim 16 wherein said first oxidation catalyst comprises a metallic substrate having a layer of an electrically nonconducting metal oxide on the surface thereof and said platinum group metal adherently deposited on at least a part of the surface of said nonconducting metal oxide.

19. The apparatus of claim 18 wherein said metallic substrate is in the form of expanded metal foil.

20. The catalyst assembly of claim 18 wherein said expanded metal foil consists of a plurality of strands of metal having a thickness ranging from about 0.002 to about 0.010 inch.

21. The apparatus of claim 18 wherein said substrate consists essentially of a base material selected from the group consisting of iron base materials, cobalt base materials and nickel base materials.

22. The apparatus of claim 18 wherein said electrically nonconducting metal oxide is an oxide of a metal selected from the group consisting of aluminum, titanium, chromium, silicon, iron, nickel, cobalt and mixtures thereof.

23. The apparatus of claim 18 wherein said substrate consists essentially of, in weight percent, about 4.5 percent aluminum, about 22 percent chromium, with the remainder being iron plus incidental impurities.

* * * * *